Patented Apr. 6, 1943

2,316,099

UNITED STATES PATENT OFFICE 2,316,099

LINOLEUMLIKE PRODUCTS

Frederick J. Myers, Philadelphia, Pa., assignor to The Resinous Products & Chemical Company, Philadelphia, Pa.

No Drawing. Application July 5, 1941, Serial No. 401,270

3 Claims. (Cl. 117—64)

This invention relates to floor and wall coverings, resembling lineolum in general appearance, but superior thereto in chemical and physical properties.

In conventional linoleum oxidized drying oils are the actual binding agents although rosin, gums, or the like may be used therewith along with pigments and fillers. Compositions prepared from these ingredients are calendered onto a woven base and the resulting composite sheet is heated or "stoved" for long periods of time until the compositions are relatively hard. As the compositions can, however, still undergo oxidation, the ageing characteristics are not always satisfactory. Light colored coverings for floor or wall are difficult to prepare since the binder is dark and becomes progressively darker during stoving. While it has been proposed that various resins be used in preparing linoleum or that various synthetic resins be used as binding agents for producing a linoleum-like product, they have not yielded a practical substitute for linoleum.

The present invention has as an object the preparation of a floor and wall covering resembling linoleum. It is an object of this invention to prepare such covering material with avoidance of the long stoving period required in producing linoleum. It is an object to prepare a floor and wall covering which does not become embrittled or otherwise changed on ageing. It is a further object to prepare covering materials which may be widely varied in such properties as resilience, hardess, toughness, and flexibility and which may be made in light colors and delicate shades.

These objects are accomplished by preparing an organic solvent-soluble urea-formaldehyde-alcohol condensate in a high-boiling, ester-type plasticizer, removing free volatile alcohol, mixing with said condensate an oil-modified alkyd resin, and incorporating modifying agents including fillers or pigments to form a plastic mass, calendering the plastic mass onto a base to form a composite sheet, and heating this sheet to cure the layer of resinous material thereon.

As an organic solvent-soluble urea-formaldehyde-alcohol condensate there may be used any of the condensates prepared by condensing urea, or a mixture of urea and other carbamide such as thiourea, melamine, thioammeline, or other triazine, with formaldehyde to form a methylol compound which is then reacted with a monohydric aliphatic alcohol, such as ethtyl, propyl, allyl, methallyl, butyl, isoamyl, or octyl alcohol in the presence of an acid catalyst. These condensates are now all known in the art and are available in solution in an excess of the alcohol used. The presence of this alcohol, however, precludes the direct use of these condensates in the preparation of floor coverings and the like, as the evaporation of the alcohol during curing causes pin-holding or pimpling of the surface.

It has been found that these undesirable effects can be avoided by heating the alcohol solution of the urea-formaldehyde-alcohol condensate in the presence of a relatively non-volatile plasticizer which is a solvent for the said condensate. The heating may, if desired, be done under reduced pressure and is continued until the volatile alcohol is essentially removed.

Suitable plasticizers are tricresyl phosphate, dimethyl phthalate, dibutyl phthalate, diamyl phthalate, di(ethoxyethyl) phthalate, etc. These plasticizers are of the ester-type, are relatively non-volatile, and are solvents for the condensates. They further serve as plasticizers for the final resinous, plastic mass which is calendered onto a base.

As an oil-modified alkyd resin, there may be used any of the soluble reaction products of a resin-forming polycarboxylic acid, a polyhydric alcohol, and a fatty acid or glyceride thereof. As a polycarboxylic acid there may be used such acids as phthalic, maleic, succinic, adipic, pimelic, sebacic, citric, or the like or mixtures thereof. Useful polyhydric alcohols include glycerol, polyglycerol, ethylene glycol, polyethylene glycols, sorbitol, mannitol, and pentaerythritol, and mixtures of the various polyhydric alcohols. The fatty materials include lauric, myristic, stearic, oleic, ricinoleic, linoleic, etc. acids, corresponding glycerides, or natural oils. There may be used with these fatty materials drying oils such as linseed, tung, hemp, soya bean, oiticica, sunflower, etc. Large proportions of such oils, however, tend to lessen the degree of improvement of the floor coverings obtained according to this invention as compared to the linoleum products heretofore available. Yet even with high proportions of these oils in the alkyd resin there is a marked decrease in the time required for stoving or curing and considerable improvement in physical properties. The alkyd resins prepared with non-drying oils or their corresponding fatty acids are preferred. Likewise, there are preferred the reaction products made with 5 to 50 parts of urea-formaldehyde-alcohol condensate to 95 to 50 parts of oil-modified alkyd resin.

To the mixture of urea-formaldehyde-alcohol condensate and oil-modified alkyd resin there may be added a great variety of modifying materials, including hard resins, waxes, metal soaps, pigments, dyes, extenders, fillers, etc. Suitable hard resins for modifying the plastic composition are ester gums, natural fossil resins, and hard oil-soluble modified phenol-formaldehyde type condensates. Such resinous modifiers should not exceed 35% of the total resinous compositions and are desirably used in amounts between 10% and 20%. Film-forming agents, such as cellulose esters or cellulose ethers, may be employed in amounts not exceeding 10% of the composition. Ethyl cellulose is particularly desirable as such an ingredient. As fillers, there may be used wood flour, ground cork or cork dust, asbestos, talc, mineral pigments, etc.

One or more of such fillers may be mixed mechanically with the resinous materials to give a plastic mass. The mass is then calendered or sheeted and pressed onto a base consisting of woven burlap, canvas, paper felt, etc. which may be sized or coated with a lacquer if desired. The composite sheet is then heated at temperatures between about 200° F. and about 300° F. for one to 15 hours, the time depending upon the temperature, the thickness of the composite sheet, and the particular plastic composition used. The heating period may be shortened by use in the mixture of a small amount of an acid substance such as a free organic acid, or a substance which evolves an acid when heated in the mass, such as ammonium phosphate, or ammonium chloride. These acidic materials serve as catalysts.

During the heating period there is reaction between the various types of resins, particularly between the urea-formaldehyde-alcohol condensate and the oil-modified alkyd resin, together with polymerization. The resulting composition is one of considerable stability and possesses marked resistance to solvents and to chemical attack. The composition does not harden further or become embrittled on ageing.

The following examples are illustrative of the preparation of the covering materials of this invention.

Example 1

A commercial condensate of urea, formaldehyde, and butanol in butanol, containing 50% solids was mixed and heated with a weight of dibutyl phthalate equal to the solids content. When no more volatile alcohol was evolved under reduced pressure, 32 parts of the solution of urea-formaldehyde-butanol condensate in dibutyl phthalate was mixed with 36 parts of a resin prepared by heating 500 parts of rosin, 67 parts of maleic anhydride, and 73 parts of glycerine at 250° C. until an acid number of 35 was attained, and 32 parts of blown castor oil were mixed in a mechanical mixer which was heated to 50° C. to form a plastic binder.

40 parts of the binder was placed in a heavy duty mixer of the Banbury type and to this were added 20 parts of kaolin, 30 parts of cork dust (45–50 mesh), and 20 parts of wood flour (70–90 mesh). The mixture was worked at a temperature of about 50° C. until homogeneous. It was then calendered onto a burlap base and stoved at 275° F. for one and one-half hours. The product was a tough, hard, resistant floor covering of excellent resilience.

Example 2

There were mixed in a Werner-Pfleiderer mixer 32 parts of the urea-formaldehyde-butanol condensate in dibutyl phthalate as described in the above example, 24 parts of blown castor oil, 18 parts of a resin prepared by heating together at 190° C. 65 parts of sebacic acid, 65 parts of phthalic anhydride, 50 parts of glycerine, and 140 parts of castor oil until an acid number of 35 was reached, and 20 parts of the rosin-maleic acid-glycerine condensate shown in the above example. The temperature of the mixture was held at 50° C. while 40 parts of kaolin, 60 parts of cork dust, 20 parts of titanium dioxide and 10 parts of ochre were incorporated. The mixture was then calendered onto a lacquered cotton sheeting and stoved at 270° F. for two hours. The resulting product was a lightly colored sheet which was tough, resistant to wear and to chemical attack.

Example 3

700 parts of a condensate of urea, formaldehyde, and isoamyl alcohol in a 50% solution in a mixture of isoamyl alcohol and toluene was mixed with 200 parts of diamyl phthalate and blended in a heavy mixer with 1450 parts of an alkyd resin prepared by heating at 210° C. a mixture of 100 parts of phthalic anhydride, 100 parts of by-product acids recovered after the separation of sebacic acid in the manufacture of sebasic acid from castor oil, 30 parts of glycerine, and 55 parts of diethylene glycol. The solvent was removed by heating at 80–90° C. under reduced pressure. There was then added 3000 parts of filling materials composed of 50 parts of lithol red, 750 parts of asbestine, 200 parts of titanium dioxide, 1000 parts of ground cork, and 1000 parts of wood flour. When the mass had been uniformly mixed, it was calendered onto a woven base and heated for two hours at 275° F. The resulting product was a strong, tough sheet suitable for floor or wall coverings.

Example 4

There were placed in a heated mechanical mixer 750 parts of a sebacic acid-phthalic anhydride-castor oil-glycerine reaction product like that shown in Example 2, 350 parts of a rosin-maleic anhydride-glycerine condensate, and 80 parts of ethyl cellulose of the medium viscosity type. These materials were worked at 150° C. until the resulting mass was homogeneous. There was then added thereto 200 parts of a 50% solution of urea-formaldehyde-butyl alcohol condensate in butyl alcohol and 50 parts of tricresyl phosphate. Mixing was continued and reduced pressure applied to remove the free butanol. Batches of 100 parts of the resinous mixture were mixed with 80 parts of titanium dioxide, 20 parts of wood flour, and 10 parts of light colored pigments. The plastic masses thus obtained were calendered into thin layers on burlap to form products suitable for wall coverings. The sheets were tough, flexible, color-retentive, and resistant to ageing.

I claim:

1. Linoleum-like floor and wall coverings comprising a fibrous base having firmly attached thereto a tough resinous layer of a plastic mass, substantially free of volatile solvent, said mass comprising a uniform mixture of an oil-modified alkyd resin, filling materials, a reaction condensate of urea, formaldehyde and a monohydric alcohol having two to eight carbon atoms, and an ester-type plasticizer in which said condensate is soluble.

2. The process for preparing linoleum-like products which comprises combining an alcohol solution of a condensate of urea, formaldehyde, and a monohydric aliphatic alcohol of two to eight carbon atoms with an ester-type plasticizer in which said condensate is soluble, removing free volatile alcohol, mixing with the condensate an oil-modified alkyd resin, incorporating with the resulting mixture fillers to form a plastic mass, calendering this mass onto a fibrous base to form a composite sheet, and heating the sheet between about 200° F. and 300° F. to insolubilize the plastic mass.

3. The process for preparing linoleum-like products which comprises combining a urea-formaldehyde-butanol condensate with an ester type plasticizer in which said condensate is soluble, removing free butanol, mixing with said condensate a non-drying oil-modified alkyd resin, incorporating fillers with the resulting mixture to form a plastic mass, calendering this mass onto a fibrous base to form a composite sheet, and heating the sheet between about 200° F. and 300° F. to insolubilize the plastic mass.

FREDERICK J. MYERS.